United States Patent [19]
Cospen et al.

[11] 3,878,018
[45] Apr. 15, 1975

[54] METHOD OF MANUFACTURING STAMPING BLANKS

[75] Inventors: Jean Cospen, Cachan; Bernard Baumann, Paris, both of France

[73] Assignee: Cebal GP, Paris, France

[22] Filed: June 16, 1972

[21] Appl. No.: 263,529

[30] Foreign Application Priority Data
June 16, 1971  France .............. 71.21783

[52] U.S. Cl. ............ 156/267; 29/472.9; 156/290; 156/306; 156/322; 156/324; 161/146; 161/213
[51] Int. Cl. .............. B32b 31/18; B32b 15/08
[58] Field of Search .......... 156/290, 291, 306, 320, 156/321, 322, 267, 324; 29/472.9; 161/146, 147, 213

[56] References Cited
UNITED STATES PATENTS

| | | |
|---|---|---|
| 2,697,162 | 12/1954 | Quandt .......................... 156/322 X |
| 2,710,046 | 6/1955 | Markus et al. .................. 156/267 X |
| 2,799,610 | 7/1957 | Magill ............................. 156/322 X |
| 3,318,744 | 5/1967 | Hurley ............................. 156/82 |
| 3,325,332 | 6/1967 | Cleereman ....................... 156/322 |
| 3,368,323 | 2/1968 | Wood ............................... 53/198 |
| 3,438,826 | 4/1969 | Eikeren et al. ................... 156/82 |
| 3,475,243 | 10/1969 | Scalora ............................. 156/69 |
| 3,560,291 | 2/1971 | Foglia et al. ...................... 156/229 |
| 3,642,552 | 2/1972 | Sibley ............................... 156/108 |

*Primary Examiner*—Douglas J. Drummond
*Assistant Examiner*—Robert A. Dawson

[57] ABSTRACT

The preparation of blanks from which stampings are formed by forming a sandwich of at least two foils, at least one of which is a thermoplastic material and in which the foils are adhered one to the other at least temporarily only in the regions from which the stamping blanks are to be formed to enable the blanks to be cut out while leaving the remainder free for separation and recovery to prevent waste.

5 Claims, 5 Drawing Figures

METHOD OF MANUFACTURING STAMPING BLANKS

This invention relates to a method of manufacturing stamping blanks from laminated materials and to apparatus for carrying out the same.

The invention relates to the field of shaping laminated materials having use particularly in the field of packaging.

It is well known to use metal and synthetic resin foils in the production of objects by stamping.

The synthetic resin foils, more commonly referred to as "plastic" foils, offer good resistance to mechanical shock and to attack by certain chemicals. Use can be made of their excellent welding properties and their mechanical rigidity enables use with certain materials. However, such foils have drawbacks which stem from their selective permeability to gases, and consequently to odors, when they are below a certain thickness. They are also subject to aging, which is accelerated under the effect of certain radiations, including ultra-violet rays. The characteristics of these foils, furthermore, depend greatly on the material used. Plastic materials which are suitable for use as the outer wall of a foodstuffs container often cannot be used in contact with the products to be packaged, and vice versa.

Metal foils are impermeable to gases and are not affected by ultra-violet rays, even when they are very thin, such as less than one-hundredth of a millimeter in the case of aluminum alloys. On the other hand, they are easily scratched and are susceptible to shock and chemical attack, such as by certain acids. As a result, such metal foils have to be protected by annealing.

Moreover, metal or plastic foils are easily stamped and accept printing quite readily.

In order to take advantage of the most interesting features of the materials available, laminates are used which comprise either alternating plastic and metal foils, or foils of different plastic materials.

Two methods are known for manufacturing stamped objects from such laminated materials.

In accordance with a first process, the different foils are separately stamped to the desired shape, after which the stamped shapes are interfitted and assembled by adhesion. Thus it is possible to recover the waste materials. However, the method requires close manufacturing and assembly tolerances, as well as delicate handling operations due to the thinness of the foil. Moreover, the need for perfect adhesion, despite differences in shrinkage and expansion between the materials, renders this technique delicate and expensive.

In accordance with a second method, a laminate is first produced by assembling and gluing together the elementary foils, after which the resulting flat laminate is stamped. The drawback originates from the difficulty in the stamping operation which can only be carried out at elevated temperature and at a limited rate, and from the fact that the waste is not recoverable.

Manufacturing costs are of utmost importance in large volume manufacture of currently used objects, such as semi-rigid containers and, even more so, light weight and flexible packages made from materials of minimal thickness. Sachets produced in this manner are likely to enjoy considerable development, particularly since they have the capacity of remaining upright by virtue of their being stamped.

It is an object of this invention to provide a method for producing blanks of laminated material from which stampings can be produced and from which the waste can be recovered.

Another object is to provide apparatus for carrying out the improved method.

These and other objects and advantages of this invention will hereinafter appear and for purposes of illustration, but not of limitation, an embodiment of the invention is shown in the accompanying drawings in which FIG. 1 is a sectional elevational view of a laminate fabricated in accordance with the practice of this invention and taken along the line 1—1 of FIG. 2;

Briefly described, in accordance with the practice of this invention, at least two foils are positioned in face to face relation, with at least one of the foils being formed of a thermoplastic material and then the foils are caused to adhere, at least temporarily, only in the regions from which the stamping blanks are to be formed.

In accordance with a first embodiment, the foils are caused to adhere in the blank forming zones by heating the foil of thermoplastic material to the pasty or adhesive stage and pressing the foils together.

In accordance with a second embodiment, the foils are permanently adhered in the blank forming portion by coating at least one of the contacting faces, in the blank forming zone, with an adhesive and then pressing the foils together while the foil or foils of thermoplastic material are heated in the blank forming zone.

The apparatus for carrying out the invention includes a reel for each foil, one or more ovens for heating the foil(s) of thermoplastic material, at least two pressure rollers for pressing the foils together, a cutting tool for separating the stamping blanks from the adhering foil, and a reel for each foil for separating and rewinding the portions of the foils remaining after the blanks have been removed.

The laminated material comprises an assembly of foils which may be either metal and plastics or all plastic foils. In the first instance, the metal and plastic foils are preferably alternately arranged.

Figure 1:
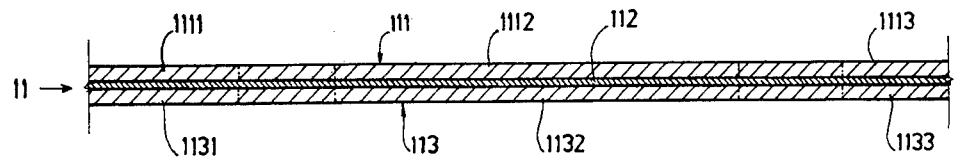
Figure 2:
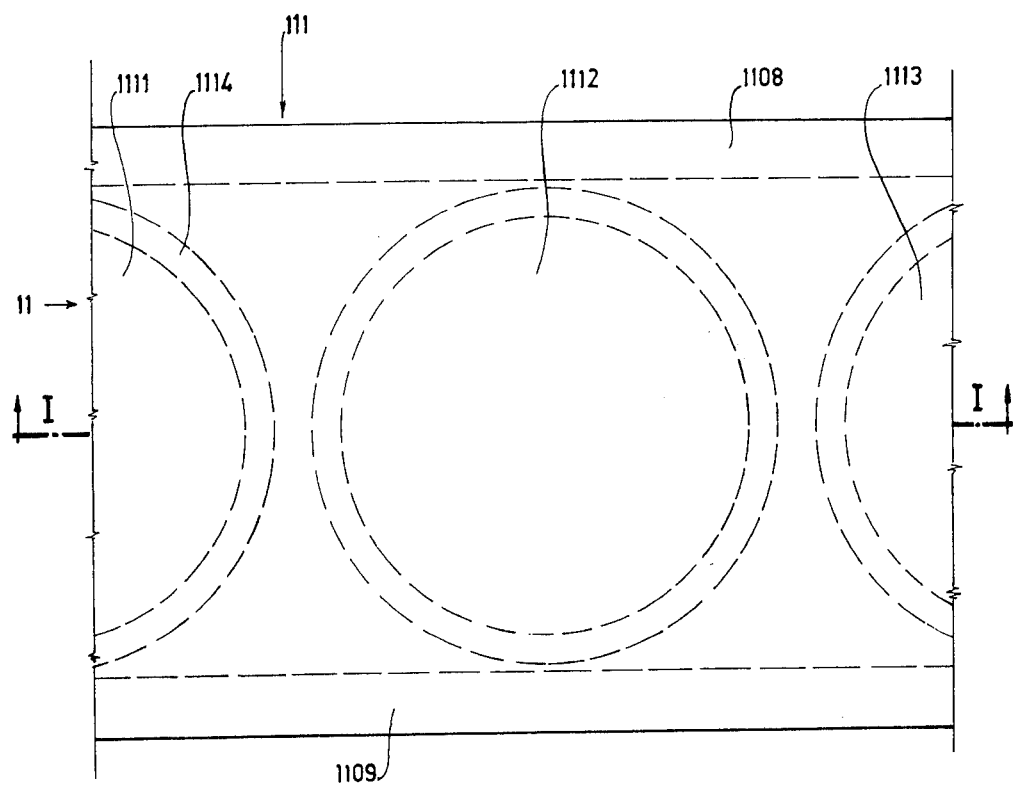
FIG. 2 is a top plan view of a laminate prepared in accordance with the practice of this invention.

By way of example, the laminated material 11, shown in FIGS. 1 and 2, is fabricated of three materials, including a foil or strip 111 of thermoplastic material, such as low pressure polypropylene, a foil or strip 112 of an aluminum alloy, and finally a foil or strip 113 of a thermoplastic material, which may be the same or different than the foil 111.

Before being brought into contact one with the other, the thermoplastic foils or strips 111 or 113 are heated in their blank forming zones 1111, 1112, 1113 and 1131, 1132, 1133, respectively. In the present example, blank forming zones are heated over their entire area to the same temperature, such as a temperature at which pasty fusion of the material commences, which may be 170° to 195°C in the case of polypropylene. The form and the area of the heated zones, on the two foils, may be identical, symmetrical or otherwise. In this manner, temporary adhesion is achieved, which lasts as long as the foils of the laminate remain at elevated temperature, that is to say, for a sufficient length of time to allow stamping, especially when the stamping machine is placed immediately following the blank production line.

Alternatively, physico-chemical adhesion is obtained between the various foils, which are in contact with one another, in the useful blank forming zones, by the addition of an adhesive of known composition or by a known localized treatment, such as the application of rays, such as ultraviolet rays.

Beyond the heated zones, the surfaces of the thermoplastic foils are at a sufficiently low temperature to allow entrainment at high speed by media used in the machines for manufacturing flat laminated material, such as by means of caterpillar traction wheels, acting on tracks 1108 and 1109, positioned along the edges of the laminated material.

The foils or strips are then pressed against one another, either over their entire surface or only in the heated zone, that is to say the useful zones which are intended to form the blanks for the stamped objects.

In one example of an embodiment, the foils 111 and 113 are of polypropylene having a thickness of 0.3 mm while the foil 112 is of aluminum having a thickness of 0.1 mm.

The metal foil may be an alloy of alumium, preferably with a small amount of alloying metals, or it may be any other metal or alloy such as tin, zinc, or brass. Annealed aluminum or an aluminum alloy containing 1 % to 2 % magnesium, is perfectly suitable. The two thermoplastic foils may be of different natures and of different thickness. They may consist of different materials, as represented by the following examples in which the corresponding heating temperatures are provided in parentheses, namely, polyvinyl chloride (145°C), high or low pressure polyethylene (175°C), polyamide 11 (185°C), polyamide 6-6 (195°C), polyimide (250° to 300 C). These materials may or need not be reinforced with fillers, such as fibers, fabrics or balls. If different thermoplastic materials are used, heating is preferably carried out at the lowest softening temperature.

The different foils, which constitute the laminated material, can be caused to adhere only over a portion of the surface of the useful blank forming zone, this portion necessarily comprising a strip bounded by the edge of the useful blank forming zone.

For a better understanding of the invention, a stamping tool will be described, which may be used for carrying out the production of the described blanks.

Figure 3:
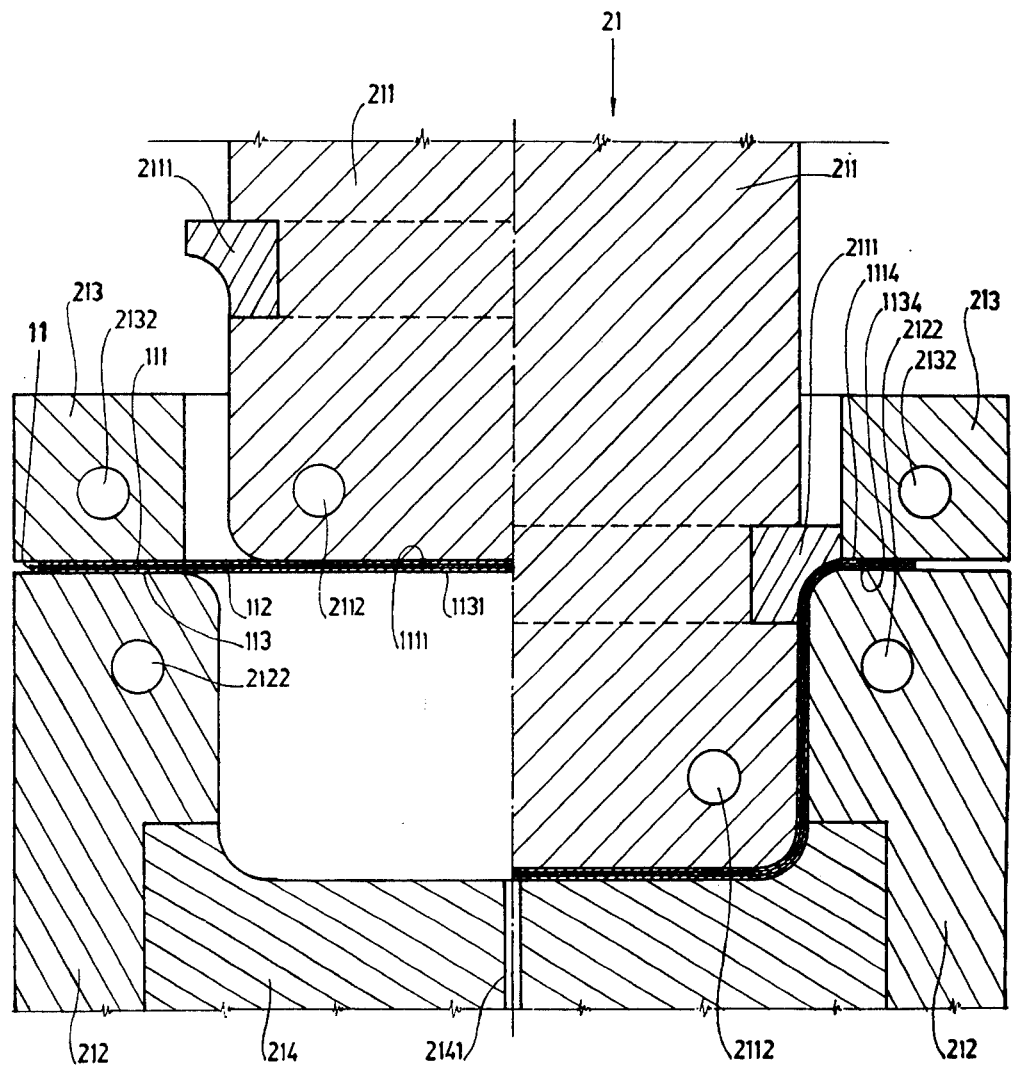
FIG. 3 is a sectional view through a stamping tool in which the portion to the left of the axis shows the tool in starting position while the portion to the right shows the tool at the end of the stamping operation.

The stamping equipment 21, as shown in FIG. 3, comprises a punch 211 shown, at the left, in the raised position, and at the right, in the lowered position at the end of the stamping operation; a die 212, a blank holder 213, and a bottom 214 provided with a passage 2141 through which air or vacuum can escape. A sealing ring 2111 is secured to the punch 211 or, in the alternative, it may be formed integral with the blank holder 213. Fluid circulated through the passages 2112–2122 and 2132 keep the various parts of the equipment at the desired temperature.

The blank of laminated material 11 is introduced into the tool while the punch is in the raised position and the blank is held stationary over the useful zone, such as 1111–1131, located beneath the punch. Under the action of a press (not shown), the punch is actuated to its lowered position to stamp out the laminated material, while the blank holder 213 provides pressure on a cold peripheral zone 1114–1134, surrounding the heated zone 1111–1131.

The volume of the laminated material, the thermoplastic elements of which have reached their softening point in the zones 1111–1131, is enclosed since it is bounded respectively by the walls of the punch 211, the die 212, the bottom 214, the blank holder 213, the sealing ring 2111, and by the rings 1114–1134, which is solid because it is cold. Stamping is facilitated by virtue of the excellent lubricating properties of the thermoplastic materials when brought to their softening temperature. The solid ring described makes it possible to prevent the softened thermoplastic material from flowing beyond the equipment. This materially enhances the quality of the stamped article.

It is possible to have the various foils, which constitute the laminated material, adhere only over a portion of the surface of the useful blank forming zone. This portion necessarily comprises a strip bounded by the edge of the useful blank forming zone.

It will be seen from the right hand portion of FIG. 3 that the parts of the laminated material at which stress, due to stamping, is at its maximum, correspond to the two folding zones, the upper zone, where the inside face of the laminate is in extension while its opposite face is in compression, and the lower zone, where the stresses are reversed. It is suitable to heat only those zones of maximum stress, to the exclusion of zones where the stresses are more homogeneous, so as to create therein zones of increased fluidity in which, by reason of the unctuous lubrication effect of the material, enhanced stamping characteristics may be enjoyed.

When a laminate interbonded throughout the useful stamp forming zone is stamped, one is limited by the characteristic features of the least favorable component material. The selective heating method, previously described, makes it possible to overcome this limitation.

Figure 4:
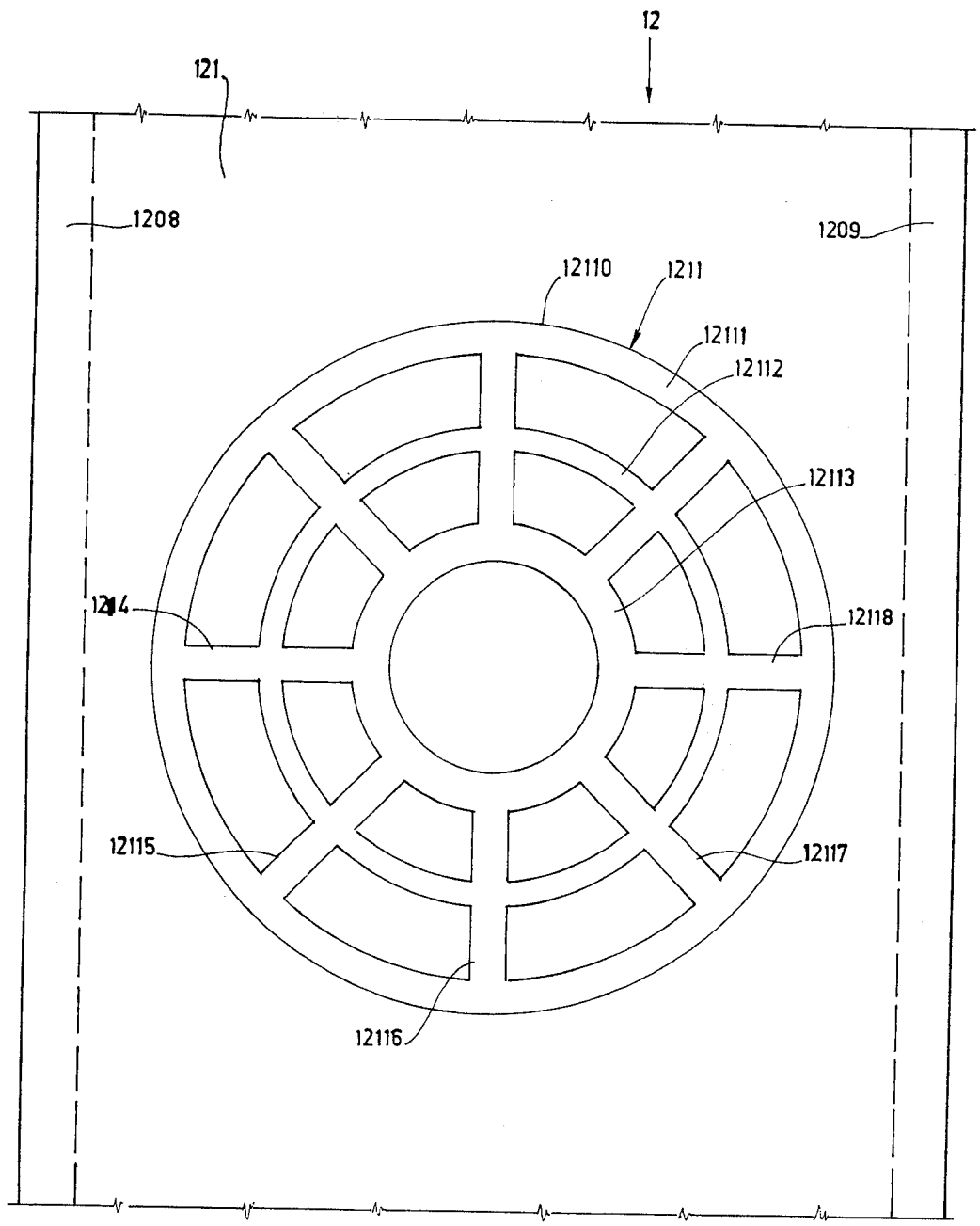
FIG. 4 is a plan view of a thermoplastic foil in which portions only in the area to be stamped are adhered.

FIG. 4 shows the laminate, which can also be seen in half-section in the left hand portion of FIG. 3.

The laminated material 12 consists of three materials including two foils 121 and 123 of thermoplastic material, between which there are sandwiched a foil 122 of aluminum alloy. The two thermoplastic foils may be of the same material or different and their thicknesses may be the same or different.

Before these three foils are brought into contact, the thermoplastic foils 121 and 122 are heated only over a portion of their useful blank forming zone 1211. In the case of 121, this part comprises concentric rings 12111, 12112 and 12113, and connecting bridges such as 12114, 12115, etc. These portions of the useful zone are heated over their entire surface to the same temperature, which is that at which pasty fusion or softening of the thermoplastic material commences. It is possible to enhance adhesion by coating the aforesaid parts of the useful blank forming zone with an adhesive or by using known localized treatment. The other portions and the zones which represent wastage, including the entrained tracks 1208 and 1209, are at a temperature below the softening point. It will be observed that the outer ring 12111 is bounded on the outside by the edge 12110 0f the useful zone 1211.

The zones to be adhered are determined by carrying out two successive stamping tests on a laminated material which is glued over its entire surface. The first of these tests is performed cold and makes it possible to determine those zones which are difficult to shape, i.e. where the thermoplastic foils resist flow. The second test is carried out hot and makes it possible to determine the zones where the plastic material undergoes excessive flow. Comparison of the results of these two tests makes it possible to determine the outline of the zone to be heated.

Thus it is possible to use a simplified stamping apparatus (not shown) which has neither the base 214 nor the sealing ring 2111.

Into this apparatus, with the stamp in raised position, a laminated material is introduced which consists of a metal foil held between two thermoplastic foils which are heated in the preferential zones, as described above with reference to FIG. 4.

The punch 211 is lowered to stamping position, whereby the remarkable influence of the localized heating on the desired zones 12111, 12112 and 12113 will be observed. In effect, it is well known that, in the case of cylindrical stamping of a metal foil on a tool with a blank holder, the foil is subject to stresses with zones which are subjected to tension, compression, and folding combined with a cold drawing action. The creation of preferential heating zones in thermoplastic foils, over surfaces substantially identical to the stressed surfaces of the metal, makes it possible by virtue of the good lubricating properties of the thermoplastic materials heated to their softening temperatures, to reduce these stresses and thereby increase the depth to which the materials can be stamped in a deep drawing operation.

Figure 5:
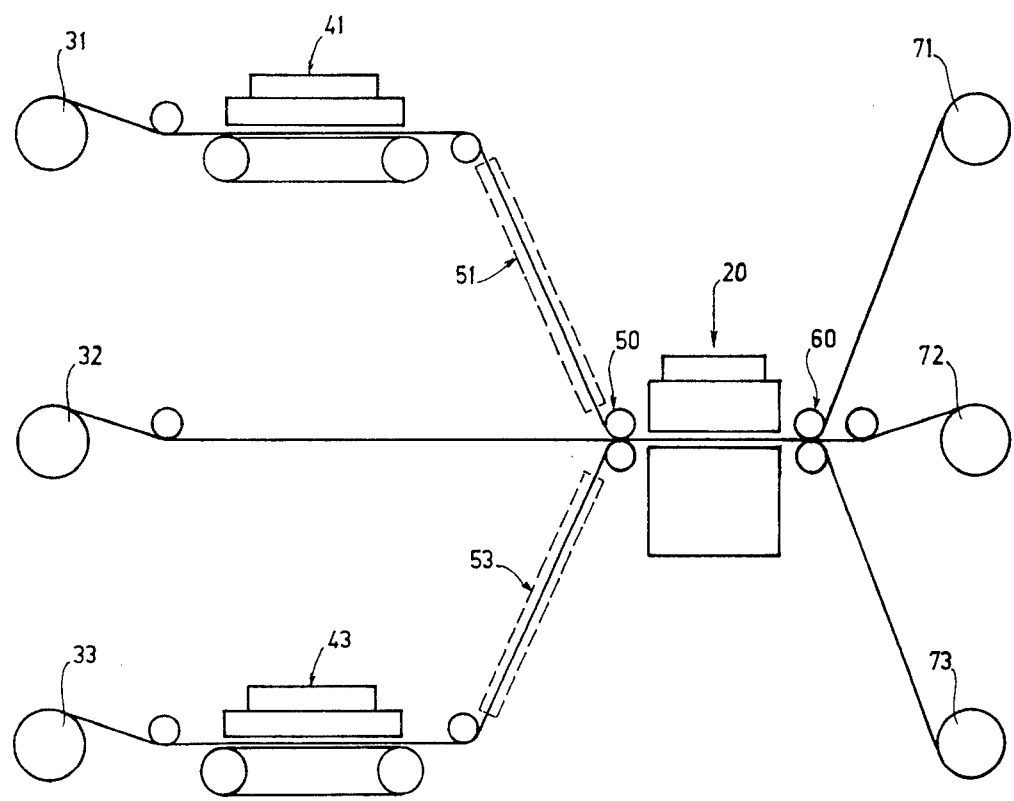
FIG. 5 is a flow diagram showing the apparatus used in the practice of this invention.

The production line shown in FIG. 5 has three reels 31, 32 and 33, in which 31 and 33 supply the plain thermoplastic strip while 32 supplies a plain metal strip, and three receiving and pull-off reels 71, 72 and 73 which receive the waste corresponding to the remainder of the strips from the reels 31, 32 and 33. The thermoplastic strips from reels 31 and 32 are heated, in localized zones, in ovens 41 and 43, which consist, for example, of the resonance cavity of a hyper-frequency apparatus, the heat from which is proportional to the area and thickness of the thermoplastic material and the speed at this it passes by. The thermoplastic strips from the reels 31 and 33, after being heated, link up with the metal strip from the reel 32 and pass between two compression rollers 50. The resulting laminated material is stamped out in apparatus 20, as represented by the apparatus previously described. The stamped article is obtained and cut out either in the actual stamping-out apparatus or in a separate apparatus by means of cutters, not shown, but well known to the art.

The materials are not rigidly joined with each other at the surfaces which have not been stamped. The strips can therefore be separated again beyond the rollers 60 and can be wound onto rollers 71, 72 and 73, which are motor driven rollers which control the rate of feed of the strips.

Isothermal sheaths 51 and 53 may be provided in order to insulate the heated thermoplastic strips with respect to the ambient temperature. They may be provided with a means for additional heating to a selected temperature.

The production line comprises a stamping tool 20 in which the articles are stamped. It is, of course, possible to delete the stamping equipment from the line and merely include in the line a well known blank cutting-out apparatus. In such event, the blanks may be stored for stamping at some later time in a separate operation. In the latter event, it is preferred to make the adhesion permanent, as has been described, by use of an adhesive or by use of an ultra-violet ray treatment.

The examples described utilize a plastics-aluminum-plastics laminated material. It will be understood that any other combination may be used, particularly combinations of plastics with two sheets of aluminum, or a combination having more than three layers, preferably being alternately plastic and metal. A combination which uses only plastic foils, preferably of different types, is also possible.

The invention is applicable to the manufacture of stamping blanks from laminated material intended preferably for the production of packaging elements, such as boxes, bottles, flasks, sachets and caps.

As used herein, the term "stamping" is meant to include "deep drawing."

It will be understood that changes may be made in the details of construction and operation without departing from the spirit of the invention, especially as defined in the following claims.

We claim:

1. In a method for the manufacture of stamping blanks formed of at least two continuous foils, at least one of which is a foil of a thermoplastic material, and at least one of which is a metal foil, wherein the portion of the foils forming the blank are at least temporarily adhered one to the other while the portion of the foils outside the blank are separable one from the other to enable recovery, comprising preheating the thermoplastic foil in the area entirely within the blank forming zone, pressing the foils together causing the foils to adhere together at least temporarily only in those preheated regions within the blank forming zone and from which the blank is to be formed by stamping, and then stamping the heated sandwich to form the stamped blank.

2. A method as claimed in claim 1 in which the adhesion is temporary and is effected by heating those regions of the foil(s) of thermoplastic material from which the blanks are to be formed until they become pasty and then pressing all the foils together.

3. A method as claimed in claim 1, in which the adhesion is permanent and is effected by coating with an adhesive at least one of the adjacent faces of the foils in those regions of the foils from which the blanks are to be formed, heating those regions of the foil(s) of thermoplastic material from which the blanks are to be formed until they become pasty and then pressing all the foils together.

4. A method as claimed in claim 1 in which the foils are bonded together only over those parts of their adjacent surfaces that are to be subjected to severe stress during stamping.

5. A method as claimed in claim 1 in which, for the stamping of a cylindrically shaped blank, the sandwich is heated before stamping in spaced concentric rings and along radial bridges connecting one ring to another.

* * * * *